United States Patent [19]

Morita et al.

[11] Patent Number: 4,734,231
[45] Date of Patent: Mar. 29, 1988

[54] PROCESS FOR THE PREPARATION OF FIBERBOARDS

[75] Inventors: Kiyozi Morita, Gunma; Masami Ando, Takasaki; Mitito Yamasaki, Gunma, all of Japan

[73] Assignee: Gunei Kagaku Kogyo Kabushiki Kaisha, Japan

[21] Appl. No.: 854,547

[22] Filed: Apr. 21, 1986

[30] Foreign Application Priority Data

Dec. 23, 1985 [JP] Japan ............................. 60-290060

[51] Int. Cl.$^4$ .................... B29C 67/22; B29C 67/16; B29C 43/20; B27N 3/02
[52] U.S. Cl. ................................ 264/45.3; 264/109; 264/DIG. 2; 264/DIG. 18
[58] Field of Search ......... 264/DIG. 2, 45.3, DIG. 6, 264/45.1, 46.4, 109, DIG. 18

[56] References Cited

U.S. PATENT DOCUMENTS

| | | | |
|---|---|---|---|
| 3,651,182 | 3/1972 | Rosenthal | 264/DIG. 6 |
| 3,764,428 | 10/1973 | Oshima et al. | 264/DIG. 2 |
| 4,035,456 | 7/1977 | Hubbard et al. | 264/DIG. 2 |
| 4,591,469 | 5/1986 | Buchanan et al. | 264/109 X |
| 4,623,584 | 11/1986 | Masui et al. | 264/DIG. 2 |

*Primary Examiner*—Philip Anderson
*Attorney, Agent, or Firm*—George A. Loud

[57] ABSTRACT

A process for the preparation of a fiberboard, including the steps of:

providing a fiber layer or mat;

forming at least one layer of expandable phenol resin particles over and/or under the surfaces of the fiber layer; and hot pressing the resulting superimposed layers to allow the expandable phenol resin particles to expand and to fill the void space within the fiber layer and to consolidate the fiber layer.

6 Claims, 1 Drawing Figure

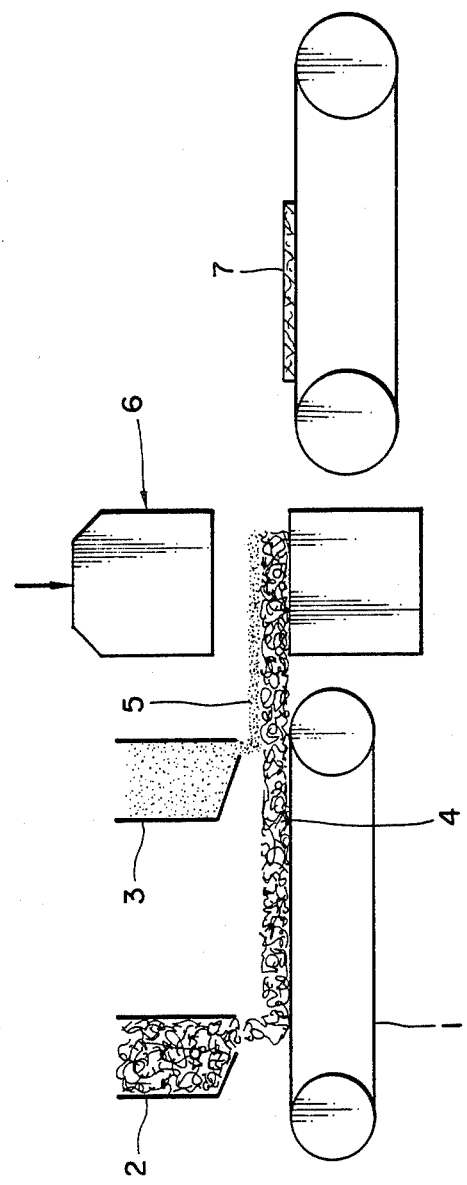

PROCESS FOR THE PREPARATION OF FIBERBOARDS

BACKGROUND OF THE INVENTION

This invention relates to a process for the preparation of fiberboards suitable for use as interior or exterior construction materials, furniture materials, interior materials for automobiles, cabinet materials for electric instruments and so on.

Fiberboards such as insulation boards are generally produced by either a wet shaping method or a dry shaping method. The wet shaping method includes the steps of dispersing defibrated cellulose fibers or pulp in water; homogeneously mixing a sizing agent such as a rosin, asphalt, paraffin, phenol resin, amino resin or starch to allow same to be adsorbed by the fibers or pulp; forming the dispersion into a wet mat of a desired thickness; dewatering the wet mat; and consolidating the dried mat under heat and pressure. In the dry shaping method, cellulose fibers are homogeneously mixed with a binder such as a phenol resin or amino resin, and the mixture is formed into a mat of a predetermined thickness, followed by a consolidation treatment by a hot press. Thus, the conventional method, irrespective of whether it is a dry method or a wet method, requires a step of commingling fibers with a sizing agent or a binder. Incidentally, the bending strength of fiberboards produced by the above known method depends upon its density. That is, in order for a fiberboard to have a high bending strength, it is necessary to increase the density of the board.

SUMMARY OF THE INVENTION

It is, therefore, an object of the present invention to provide a process by which a fiberboard with both a high bending strength and a low density may be produced.

It is a special object of the present invention to provide a simple process which does not require a step of commingling fibers with a binder.

In accomplishing the foregoing objects, the present invention provides a process for the preparation of a fiber board, comprising the steps of:
  providing a fiber layer;
  forming at least one layer of expandable phenol resin particles adjacent to at least one of the upper and lower surfaces of said fiber layer; and
  applying heat and pressure to said fiber layer and said at least one layer of expandable phenol resin particles to allow said expandable phenol resin particles to expand and to fill the void space within said fiber layer and to consolidate said fiber layer.

BRIEF DESCRIPTION OF THE DRAWING

Other objects, features and advantages of the invention will become apparent from the detailed description of the present invention which follows, when considered in light of the accompanying drawing, in which:

the sole FIGURE is a schematic representation of an apparatus used for carrying out the process of the present invention.

DETAILED DESCRIPTION OF THE INVENTION

Any fiber may be used for the preparation of fiberboards according the process of the present invention. Illustrative of suitable fibers are cellulose fibers customarily employed for the preparation of hard, semihard or light fiberboards; inorganic fibers such as glass wool and rock wool employed as an insulator or sound absorber, natural fibers such as cotton, wool, jute, and synthetic polymeric fibers such as polyamide fibers, polyester fibers and acrylic fibers.

In the present invention, the fibers are used in the form of a layer or a mat. The thickness of the mat may vary with the kind and bulk density of the mat and the intended thickness and properties of the fiberboard product. Generally, the fiber layer has a thickness of about 1-100 mm.

The fiber layer is overlaid with or superimposed on a layer of an expandable phenol resin particles and then subjected to a consolidation treatment under heat and pressure. If desired, two phenol resin layers may be placed at both surfaces of the fiber layer. It is also possible to use two or more superimposed fiber layers with a layer of expandable phenol resin particles inserted between each adjacent two fiber layers. The expandable phenol resin may be a composition including a novolak-type phenol resin, a curing agent such as hexamethylenetetramine, and a foaming agent such as sodium hydrogencarbonate or a composition including a resol-type phenol resin, and a foaming agent such as sodium hydrogencarbonate. The expandable resin is used in the present invention in the form of particles or powder having a particle size preferably of 5 mm or less, more preferably 1 mm or less. The expandable phenol resin particles are preferably used in an amount of 10-150 parts by weight, more preferably 50-100 parts by weight per 100 parts by weight of the fiber layer.

The fiber layer and the expandable phenol resin particles layer are then subjected to a compression molding at a temperature and a pressure so that the phenol resin particles are allowed to expand and to fill the void space within the fiber layer and the fiber layer is consolidated. The compression molding is preferably conducted at a temperature of 120°-200° C. and a pressure of 0.5-30 Kgf/cm$^2$ for a period of time of 0.5-30 min.

FIG. 1 depicts one preferred embodiment of an apparatus for carrying out the process according to the present invention, in which the reference numeral 1 denotes a running conveyor with a pair of spaced hoppers 2 and 3 suspended for dispensing fibers and expandable phenol resin particles, respectively. The fibers within the hopper 2 are deposited on the travelling conveyor surface to form a fiber layer 4 thereon. The expandable phenol resin particles in the hopper 3 are scattered on the surface of the fiber layer 4 to form a resin layer 5 thereon. The fiber layer 4 overlaid with the resin layer 5 is then introduced into a compression molding machine 6, which is known per se, where the layers 4 and 5 are subjected to heat and pressure. Thus, the expandable phenol resin melts and expand, for example, with an expansion ratio of 5-50. Because of the expansion, the phenol resin can penetrate into and fill the entire void space within the fiber layer which is being pressed. The phenol resin is then crosslinked so that the fibers are bound and consolidated to obtain a fiberboard generally having a thickness of 0.1-100 mm. Since the expanded phenol resin has a density of 0.02-0.2 g/cm$^3$, the resultant fiberboard has a small density and yet a high bending strength. By using suitable press molds, fiberboards with various shapes such as flat boards and curved boards may be prepared.

The following examples will further illustrate the present invention.

EXAMPLE 1

2000 Grams of cellulose fibers used for the preparation of conventional hard fiberboards were spread on a platen having an operating area of 1 m×1 m to form a fiber layer having a thickness of 100 mm. 2000 Grams of expandable phenol resin particles with a particle size of 1 mm were evenly scattered on the fiber layer to form a resin layer having a thickness of about 1 mm over the surface of the fiber layer. After providing a distance bar having a height of 10 mm, the fiber layer was hot pressed at a temperature of 150° C. and a pressure of 5 Kgf/cm$^2$ for 5 min to obtain a fiberboard having a thickness of 10 mm, a density of 0.38 g/cm$^3$ and a bending strength of 230 Kgf/cm$^2$.

EXAMPLE 2

150 Grams of expandable phenol resin partices similar to those used in Example 1 were spread on a 1 m×1 m size platen to form a first resin layer, on which 600 g of glass wool for use as a conventional heat insulating material were spread to form a fiber layer. Then another 150 g of the expandable phenol resin particles were scattered over the surface of the fiber layer to form a second resin layer thereon. After inserting 3 mm thick distance bar between press molds, the superimposed layers were hot pressed at a temperature of 160° C. and a pressure of 2 Kgf/cm$^2$ for a period of time of 2 min, thereby to obtain a fiberboard having a thickness of 3 mm, a density of 0.25 g/cm$^3$ and a bending strength of 290 Kgf/cm$^2$.

EXAMPLE 3

300 Grams of expandable phenol resin particles similar to those used in Example 1 were spread on a 1 m×1 m platen, over which 600 g of rock wool for use as a conventional heat insulating material were evenly spread to form a fiber layer. Then, another 300 g of the phenol resin particles were scattered over the surface of the fiber layer. After positioning a 3 mm thick distance bar in a pressing zone, the superimposed layers were hot pressed at a temperature of 180° C. and a pressure of 20 Kgf/cm$^2$ for 1 min, thereby obtaining a fiberboard having a thickness of 3 mm, a density of 0.39 g/cm$^3$ and a bending strength of 460 Kgf/cm$^2$.

The thus obtained fiberboards were cut to examine the inside structures thereof. The inside space of these fiberboards were found to be completely filled with the expanded phenol resin.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the preparation of a fiberboard, consisting essentially of the steps of:
   providing a layer of loose fibers;
   forming at least one layer of expandable phenol resin particles adjacent to at least one of the upper and lower surfaces of said fiber layer, the amount of said particles being 10-150 parts by weight per 100 parts by weight of said loose fiber; and
   heating said layer of loose fibers and said at least one layer of expandable phenol resin particles under 0.5-30 Kgf/cm$^2$ pressure at 120°-200° C. for 0.5-30 minutes to cause said expandable phenol resin particles to expand and to fill the void space within said fiber layer, thereby consolidating said layer of loose fibers.

2. A process as claimed in claim 1, wherein only one layer of the expandable phenol resin particles is provided on the upper surface of said fiber layer.

3. A process as claimed in claim 1, wherein only one layer of the expandable phenol resin particles is provided under the lower surface of said fiber layer.

4. A process as claimed in claim 1, wherein two layer of the expandable phenol resin particles are provided on the upper surface and under the lower surface of said fiber layer, respectively.

5. A process as claimed in claim 1, wherein said fiber layer has a thickness of about 1-100 mm.

6. A process as claimed in claim 1, wherein the consolidation is effected by means of a compression molding machine.

* * * * *